Patented Feb. 28, 1933

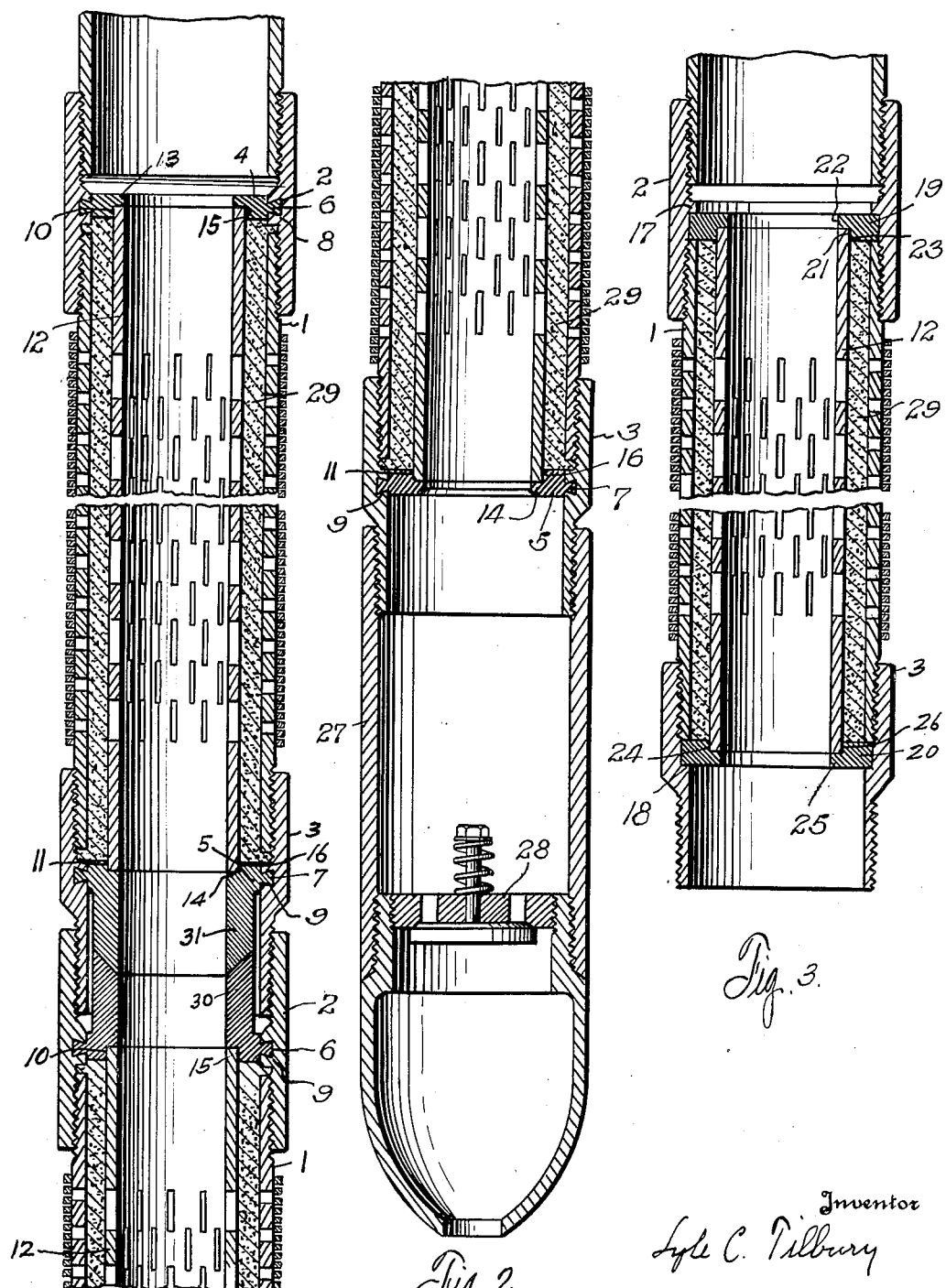

1,899,065

UNITED STATES PATENT OFFICE

LYLE C. TILBURY, OF HOUSTON, TEXAS

WELL SCREEN

Application filed December 30, 1930. Serial No. 505,521.

This invention relates to a novel well screen.

One object of the invention is to provide a screen of the character described specially designed for use in wells and which is of such construction that it will not be readily destroyed by the erosive effect of the fine sand in the oil or gas flowing under pressure into the screen.

As at present constructed well screens are made up of pipe having screening openings therein which are of such size as to arrest the coarser sand and grit, but the finer particles thereof pass on in through the screen openings with the fluid, which is usually under pressure, and these fine gritty particles soon enlarge the screen openings, by erosion, until the coarser sands are permitted to enter and the screen is then ruined.

It is a principal object of this invention to provide a screen having an outer screening jacket and an inner screen pipe therein and spaced therefrom with a suitable aggregate, such as carborundum, or other suitable substance filling the space between the jacket and screen pipe and through the interstices of which the oil or gas and fine sand may flow into the screen proper and which will not be eroded away by the action of the fine sand and which will also arrest the coarser sands and exclude the same from the screen, said screen being of such construction that it may be readily assembled at the shop in sections, and the assembled sections then moved to the well and lowered therein, said sections being of such construction that if more than one section is to be used in the well, the sections may be readily connected together as lowered.

Another principal object of the invention is to provide a screen of the character described of such construction that the inner screen pipe may be readily removed, after the screen has been set in the well, if for any reason it be desired to remove the same, as for example when it is desired to drill deeper; and when said inner screen pipe is so removed drilling operations may be carried on through the jacket and the well deepened.

A still further feature of the invention resides in the provision of novel means for anchoring the inner screen pipe in, and maintaining it in spaced relation to, the outer jacket.

With the above and other objects in view, this invention has particular relation to certain novel features of construction, arrangement of parts and use, an example of which is given by way of illustration in this specification and illustrated in the accompanying drawing, wherein:

Figure 1 shows a vertical sectional view of the upper end of a screen constructed in accordance with the invention and embodying a plurality of sections.

Figure 2 shows a vertical sectional view of the lower end thereof, showing a set shoe and back pressure valve connected thereto, and Figure 3 shows a vertical sectional view of a section of the screen constructed in accordance with the invention and showing a modified form thereof.

Referring now more particularly to the drawing wherein like numerals of reference designate similar parts in each of the figures, the numeral 1 designates an outer tubular, foraminated, jacket preferably of the form of a perforated pipe wrapped with screen wire. This jacket has the upper and lower couplings 2, 3 threaded to the respective upper and lower ends thereof. In the form shown in Figures 1 and 2 there are the upper and lower spacer rings 4, 5. These rings may have the external ribs as 6, 7 thereon which are seated in corresponding inside annular grooves 8, 9 in the respective collars 2, 3. The said ribs may be of dovetailed form if desired and the corresponding grooves in which the ribs are seated may be of a similar dovetailed form. The rings 4, 5 are preferably formed of bronze or other suitable frangible material and may be moulded into place. The underside of the ring 4 and the upper side of the ring 5 have the counter sunk annular recesses 10, 11 in which the corresponding ends of the screen pipe 12 are seated, thus forming the annular flange or ledge 13 which abuts the upper end of the screen pipe and a similar annular flange or ledge 14 upon which the lower end of the screen pipe rests, and also forming the annular shoulder 15, 16 which surround the upper and lower ends, respectively, of the inner screen pipe and hold said inner screen pipe centered, with respect to, and spaced from the outer jacket.

In the form shown in Figure 3 the coupling 2 has an inside downwardly facing annular shoulder 17 and the coupling 3 has the inside annular upwardly facing shoulder 18 and seated against these respective shoulders are the upper and lower annular rings 20, 21 preferably formed of bronze or other suitable frangible material. The upper ring has an annular recess 21 on the under side thereof around the opening therethrough to receive the upper end of the inner screen pipe 12 thus providing an inside annular flange 22 which abuts said end of said inner screen pipe and an annular shoulder 23 which surrounds said end. The lower ring 20 has an annular recess 24, in its upper face around the opening therethrough thus providing an inside annular flange 25 on which the lower end of the inner screen pipe 12 rests and also providing an annular shoulder 26 which surrounds said lower end of said inner screen pipe.

In both forms of the screen the space between the outer jacket and inner screen pipe is filled with aggregate, preferably carborundum, or other material that will not be eroded away by the gritty fluid passing therethrough. This aggregate is retained in place by the spacer rings refered to.

The screen to be lowered in the well may be composed of a single section, assembled as shown, or a plurality of sections may be connected together as the screen is lowered in the well. In making this connection the lower reduced, externally threaded, end of the coupling 3 of a screen section is screwed into the upper end of the coupling 2 of the section beneath.

A suitable set shoe as 27 of any selected type may be screwed onto the lower coupling 3 of the screen, whether the screen is made up of a single section or a number of sections connected together. This set shoe may be provided with a conventional type of back pressure valve 28.

After the screen is set in the well, if it be desired to deepen the well by carrying on further drilling operations through the screen the inner screen pipe may be easily removed. If it be desired to remove the inner screen pipe, a suitable fishing tool may be lowered into the well and engaged in the upper end of the screen pipe 12 and it may be readily pulled out, the ring 4, or 19, as the case may be, above it readily yielding or breaking to permit the removal of said inner screen pipe. If the screen is made up of a number of sections, the inner screen pipes 12 may be removed one at a time from above downwardly as above explained. When in any screen pipe 12 is removed the spacer ring 5 or 20, as the case may be, will remain in its coupling, but when the next succeeding inner screen pipe beneath is pulled out this spacer ring above will be carried out with it and the last spacer ring at the bottom of the screen being of soft frangible material, may be readily drilled out.

With the inner screen pipes removed the aggregate 29 will fall down into the well and the back pressure valve 28 and the set shoe may then be drilled out and drilling operations resumed through the outer jacket.

When two or more sections of the screen are connected together as shown in Figure 1, it is desirable that a uniform passageway for the fluid be maintained through the joint and in such case the rings 4, 5 may have the extended sleeves 30, 31 whose ends abut and are reversely beveled as shown to provide a uniform fluid passageway through said joint.

The drawing and description disclose what is now considered a preferred form of the invention, by way of illustration only, while the broad principle of the invention will be defined by the appended claims.

What I claim is:—

1. A well screen including an outer jacket and an inner pipe spaced from the jacket, each having a screening surface, aggregate in the space between said jacket and inner pipe, an upper and a lower ring in the jacket, said rings having countersunk, annular, recesses forming seats in which the corresponding ends of the inner pipe are seated.

2. A well screen including an outer jacket, an inner pipe therein, said jacket and pipe each having a screening surface, spacer rings having annular, countersunk, recesses forming seats in which the respective ends of the inner pipe are seated, said rings being anchored with respect to the jacket and forming means for anchoring the inner pipe in, and in spaced relation to, said jacket.

3. A well screen including an outer jacket, an inner pipe therein, said jacket and pipe each having a screening surface, spacer rings having annular, countersunk, recesses forming seats in which the respective ends of the inner pipe are seated, said rings being anchored with the respect to the jacket and forming means for anchoring the inner pipe in, and in spaced relation to, said jacket, one of said rings being formed of frangible material to permit the withdrawal of the inner pipe from said jacket.

4. A well screen including an outer jacket, an inner pipe therein spaced from the jacket, said jacket and pipe having screening surfaces, screening material in the space between said jacket and pipe, upper and lower rings anchored with respect to the jacket each having an annular inside recess and an adjacent annular ledge, the ends of the inner pipe being seated in said recesses and abutting said ledges.

5. A screen including an outer, tubular, jacket, couplings forming the ends of the jacket having inside grooves, rings in the couplings having annular ribs seated in said grooves, an inside pipe in the jacket whose ends are anchored to said respective rings, said rings forming means to space said pipe from said jacket, said jacket and pipe having screening surfaces, screening material in the space between said jacket and pipe.

6. A screen including an outer, tubular, jacket, couplings forming the ends of the jacket, rings in the couplings, an inside pipe in the jacket whose ends are anchored to said respective rings, said rings forming means to space said pipe from said jacket, said jacket and pipe having screening surfaces, screening material in the space between said jacket and pipe, one of said rings being formed of relatively soft material so as to be readily disruptable to permit the easy withdrawal of the inner pipe from the jacket.

7. A well screen formed of sections, connected together, each section including an outer jacket, annular inwardly extending anchors at the ends of the jackets, an inner pipe within each jacket and spaced therefrom whose ends are supported by said anchors, the anchors at the connected ends of the sections being formed with extended sleeves which abut to form a uniform passageway through the joint, said jackets and inner pipes having screening surfaces and screening material in the space between each jacket and the corresponding pipe.

8. A well screen formed of sections connected together, each section including an outer jacket, an inner pipe within each jacket and spaced therefrom anchors at the connected ends of the sections and supporting the adjacent ends of the inner pipes said anchors being formed with extended sleeves which abut to form a uniform passageway through the joint, said jackets and inner pipes having screening surfaces.

In testimony whereof I have signed my name to this specification.

LYLE C. TILBURY.